(No Model.)

F. WECKERLY.
HORSESHOE.

No. 263,005. Patented Aug. 22, 1882.

Attests
James F. Donahue.

Inventor
Frank Weckerly
By his atty.

United States Patent Office.

FRANK WECKERLY, OF PHILADELPHIA, PENNSYLVANIA.

HORSESHOE.

SPECIFICATION forming part of Letters Patent No. 263,005, dated August 22, 1882.

Application filed March 13, 1882. (No model.)

*To all whom it may concern:*

Be it known that I, FRANK WECKERLY, of the city and county of Philadelphia, and State of Pennsylvania, have invented an Improvement in Horseshoes, of which the following is a specification.

My invention has reference to horseshoes provided with detachable calks; and it consists in securing the calks to the shoe proper by providing them with oblique projections, which fit into corresponding holes or slots in the body of the shoe, said calks being arranged in pairs, and each of the calks in a pair having its projection pointing in an opposite direction to that on its fellow, and in securing said calks in place by a key, which is driven into a keyway formed by grooves in said calks and the under side of the body of the shoe; further, in placing between the said calks and the body of the shoe an elastic or equivalent medium to make the calks fit tight and prevent any noise from rattling, all of which is fully set forth in the following specification and shown in the accompanying drawings, which form part thereof.

Shoes made after the herein-described construction may be worn until the growth of the hoof renders removal necessary, and during that time the calks may be kept constantly sharp. The body of the shoe may be fitted to the hoof while hot, care being taken to insert the cold calks in position when shaping to preserve the slots or holes. Without removing the shoe the sharp calks may be removed and flattened ones substituted, thus preserving the surface of the shoe and increasing its durability.

Calks for horseshoes have been made with oblique projections; but each of the calks has been provided with two or more projections pointing in different directions; but in no case have calks been made having the projections oblique in one direction only, and provided with a keyway to enable the calks to be used in pairs.

Figure 1:
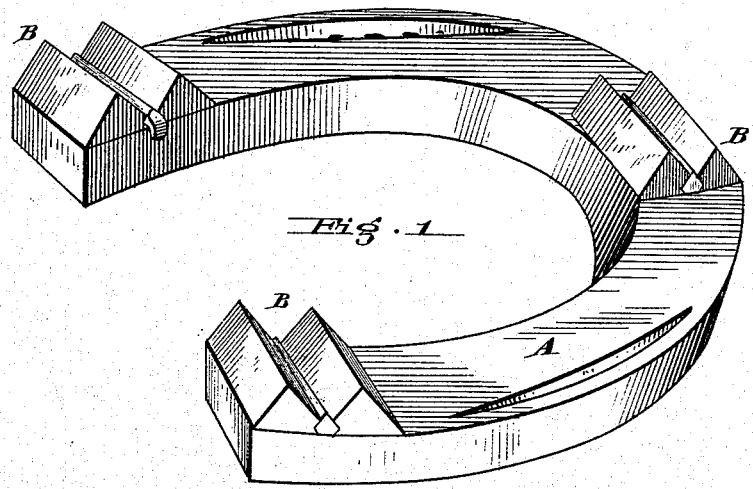
Figure 2:
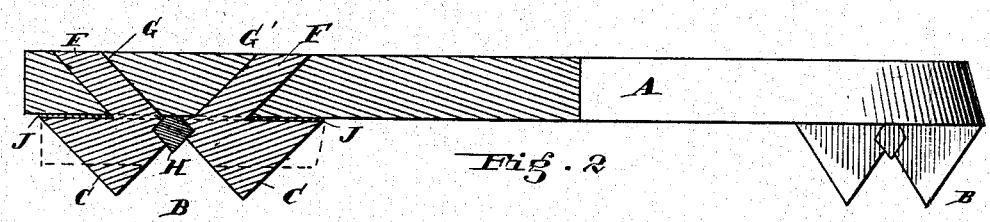
Figure 3:
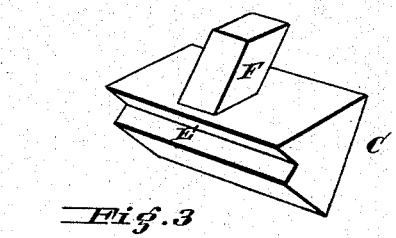
Figure 6:
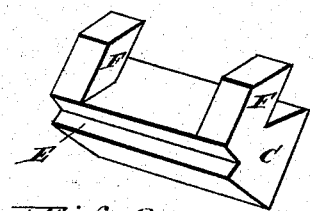
Figure 4:
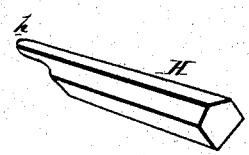
Figure 5:
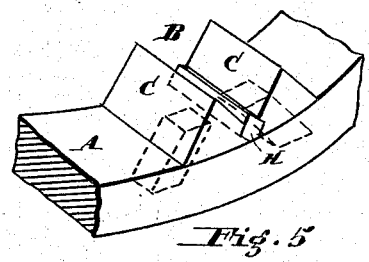

In the drawings, Figure 1 is a perspective view of my improved shoe turned over. Fig. 2 is a side elevation of same with part in section. Fig. 3 is a perspective view of one of the calks. Fig. 4 is a perspective view of the key. Fig. 5 is a perspective view, showing a modification of toe-calk; and Fig. 6 is a perspective view of a modified form of calk.

A is the body of the shoe, and B are the calks. The body is preferably of flat metal, and is provided with the oblique slots or holes G G', said holes being arranged in pairs, and diverging from below upward, as shown in Fig. 2.

The calks C are made of cast or forged steel, and may be pointed, flattened, or provided with a knife-edge, D. Their upper surfaces are flat, and are provided with one or more oblique projections, F, which are adapted to fit into the holes or slots G G' in the body A. Upon the upper edge of the calks, and on the side from which the projections spring, are keyways or grooves E, in which one side of the key H slides when keying said calks in place. This key H is preferably made slightly tapering, as are also the grooves E, and may be provided on the small end with a part, $h$, adapted to be bent over to secure the said key in place after being driven home. These calks are made in pairs, and the adjacent surfaces should be made oblique to correspond to the obliquity of the projections to enable them to be inserted. When a pair of said calks have been placed in position, with their projections F in their respective slots or holes G G', the key H is driven in between them, clamping them firmly in position, and after being so clamped the end $h$ is bent over to retain the key and prevent all possibility of its coming out.

If desired, a packing, J, made of paper saturated with tar or paraffine, or of thin rubber, may be placed between the shoe-body and calks to secure a true joint and prevent noise.

The projections F may be of any shape desired in cross-section, and may be passed through the body of the shoe, or may fit into slots or grooves in the sides. This latter case would be the result of using the calk shown in Fig. 6.

The key may be of any desired shape, that shown being preferred.

Having now described my invention, what I claim as new, and desire to secure by Letters Patent, is—

1. A horseshoe having oblique holes, and provided with detachable double calks having oblique projections, said calks being retained in place by a key driven between them, substantially as and for the purpose specified.

2. A horseshoe-body, in combination with calks which are made in pairs, and a key which, when driven between said calks, secures them firmly to the shoe-body and prevents them falling out, substantially as and for the purpose specified.

3. A horseshoe-body provided with oblique holes, slots, or grooves arranged in pairs, in combination with detachable calk-pieces made in pairs, and provided with corresponding projections which fit into the body, said projections on a pair of calks pointing in opposite directions, and a key to force them apart and secure them firmly to the body, as set forth.

4. A horseshoe-body provided with oblique holes, slots, or grooves arranged in pairs, in combination with detachable calks made in pairs, and provided with corresponding projections which fit into the body, said projections on a pair of calks pointing in opposite directions, a key to force them apart to secure them firmly to the body, and a packing arranged between said calks and shoe-body, substantially as and for the purpose specified.

5. The calk C, provided with oblique projections F, all pointing in the same direction, and keyway E, substantially as shown and described.

In testimony of which invention I hereunto set my hand.

FRANK WECKERLY.

Witnesses:
R. M. HUNTER,
R. S. CHILD, Jr.